United States Patent
Nakano et al.

(10) Patent No.: US 6,360,054 B1
(45) Date of Patent: *Mar. 19, 2002

(54) VIDEO STORAGE TYPE COMMUNICATION DEVICE

(75) Inventors: Hirotaka Nakano, Tokyo; Osamu Hakamura, Saitama; Youji Kanada, Tokyo; Tsuneko Kura, Kanagawa; Takashi Oshima, Tokyo; Tadashi Uchiumi; Keiichi Hibi, both of Chiba; Jiro Nakabayashi, Saitama; Tsuneaki Iwano, Tokyo; Nobuyuki Ema, Chiba, all of (JP)

(73) Assignees: Sharp K.K.; Nippon Telegraph & Telephone Corp., both of Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,133

(22) Filed: Dec. 30, 1999

Related U.S. Application Data

(62) Division of application No. 08/942,291, filed on Oct. 1, 1997, now Pat. No. 6,078,721, which is a continuation of application No. 08/508,077, filed on Jul. 27, 1995, now abandoned.

(30) Foreign Application Priority Data

| Jul. 29, 1994 | (JP) | 6-178690 |
| Apr. 7, 1995 | (JP) | 7-082569 |
| Apr. 7, 1995 | (JP) | 7-082609 |

(51) Int. Cl.[7] ............................................. H04N 5/783
(52) U.S. Cl. ................................... 386/68; 386/111
(58) Field of Search ........................... 386/46, 68, 111, 386/112, 70, 80, 81, 124, 125, 52; H04N 5/783

(56) References Cited

U.S. PATENT DOCUMENTS 4,931,879 A    6/1990  Koga et al.

(List continued on next page.)

FOREIGN PATENT DOCUMENTS

EP          471482 A2    2/1992

(List continued on next page.)

*Primary Examiner*—Huy Nguyen

(57) ABSTRACT

A device which is capable of storing moving picture data received from each terminal and providing each terminal with video information to be reproducible by rapidly forwarding or reversing at any desired speed independent of usable terminals. A video storage type communication device 30 with a receiving portion 35 and a transmitting portion 38 transmits and receives video data over a communication network 10 to and from each terminal 1–n. A coded video data received from terminals 1–n is stored as it is in a first storage portion 32 and, at the same time, the data converted into specially reproducible video information is stored in the second storage portion 33. At the time of reproducing, the reproduction control portion 35 controls the reproduction selector switch 36 to obtain the video data from the first storage portion 32 or the second storage portion 33, changing the reproduction mode from ordinary to the rapid forwarding/reversing and vice versa. The specially reproducible video generating portion 34 successively restores coded video data received through the receiving portion 31, encodes again the restored data by intraframe, interframe or still-picture coding method to generate video information to be reproducible in special mode such as reproduction by rapid forwarding or reversing.

8 Claims, 15 Drawing Sheets

U.S. PATENT DOCUMENTS

| | | | |
|---|---|---|---|
| 4,963,995 A | | 10/1990 | Lang |
| 5,142,362 A | | 8/1992 | Masera et al. |
| 5,212,742 A | | 5/1993 | Normile |
| 5,377,051 A | | 12/1994 | Lane et al. |
| 5,479,303 A | | 12/1995 | Suzuki et al. |
| 5,486,931 A | | 1/1996 | Kim et al. |
| 5,526,476 A | | 6/1996 | Motokado et al. |
| 5,535,008 A | | 7/1996 | Yamagishi et al. |
| 5,537,131 A | | 7/1996 | Mitsuhashi et al. |
| 5,543,932 A | | 8/1996 | Chang et al. |
| 5,550,593 A | * | 8/1996 | Nakabayashi ............... 348/465 |
| 5,581,360 A | * | 12/1996 | Matsumura et al. .......... 386/52 |
| 5,587,806 A | | 12/1996 | Yamada et al. |
| 5,589,993 A | | 12/1996 | Naimpally |
| 5,646,685 A | | 7/1997 | Enokida |
| 5,742,729 A | * | 4/1998 | Ema et al. .................... 386/68 |
| 5,796,436 A | * | 8/1998 | Shioi et al. ................. 386/111 |
| 5,805,762 A | * | 9/1998 | Boyce et al. ................. 386/68 |
| 5,886,742 A | | 3/1999 | Hibi et al. |
| 6,023,553 A | * | 2/2000 | Boyce et al. ............... 386/109 |
| 6,078,721 A | * | 6/2000 | Uchimi et al. ............... 386/68 |

FOREIGN PATENT DOCUMENTS

| | | |
|---|---|---|
| EP | 0516371 | 12/1992 |
| EP | 516371 | 12/1992 |
| EP | 0579156 | 1/1994 |
| EP | 579156 | 1/1994 |
| EP | 596527 | 5/1994 |
| EP | 0596527 | 5/1994 |
| EP | 606856 | 7/1994 |
| EP | 0606856 | 7/1994 |
| EP | 7077969 | 3/1995 |
| GB | 2273805 A | 12/1993 |
| JP | 0530463 | 2/1993 |
| JP | 591497 | 4/1993 |
| JP | 52-16800 | 8/1993 |
| JP | 52-76193 | 10/1993 |
| JP | 52-76479 | 10/1993 |
| JP | 60-62399 | 3/1994 |
| JP | 6105280 | 4/1994 |
| JP | 62-84414 | 10/1994 |

* cited by examiner

VIDEO STORAGE TYPE COMMUNICATION DEVICE

This application is a divisional of application Ser. No. 08/942,291 filed on Oct. 1, 1997, U.S. Pat. No. 6,078,721, which in turn was a CON. application of application Ser. No. 08/508,077, filed Jul. 27, 1995, now abandoned the entire contents of which are hereby incorporated by reference.

BACKGROUND OF THE INVENTION

The present invention relates to a video storage type communication system and more particularly to a video storage type communication device which is capable of successively decoding received coded video data by video decoding means, encoding the decoded video frame/field (hereinafter simply referred to as frame) only in intraframe mode by coding means and stored in a center storage device, thereby realizing the possibility of generating pictures specially reproducible, for example, with rapid feeding.

Recently, with the spread and progress of digital transmission lines and the advance of image processing technology based upon the development of high speed digital signal processing methods and related LSI technology, there has been an increasing demand for development of effective method of using video information services using high-speed digital communication networks, e.g., ISDN (Integrated Services Digital Networks). Video telecommunication services and a video conferencing services are well known as currently available video communication services. The most newly emerging services are video information database services which allow each user by using his audiovisual terminal set (referred to as a terminal) to access a database storage (recording device) of a host center and to obtain desired video information therefrom. One of these systems is a storage type communication device for use in a host center, which is intended to control storing video information in a center storage and reproducing the video information at each terminal from the host center. A conventional storage type communication system for providing a video storage-and-delivery service has a video storage type communication device, a video storage portion, a communication control portion, a receiving portion, a transmitting portion and etc., and a video data coded by any one of the terminals is transmitted over the communication network to the receiving portion. The receiving portion divides a received coded video-data into frames and transmits the frames to the video storage portion, and the video storage portion stores the received coded video-data (frames) therein according to an instruction given by the communication control portion. The video storage type communication device is intended to be connected with an audiovisual terminal (hereinafter abbreviated to AV terminal) which conforms the recommendation ITU-T (International Telecommunications Union) and meets the recommendation H.261 on a video information coding system.

In the video storage and communication services, it is desired to prepare functions of video reproduction with rapid forward or rapid reverse feeding. However, video data coded according to the recommendation H.261 is usually coded by interframe coding method and therefore consists of differential information. If a first frame data is interframely coded, each receiving terminal can not restore the frame into an image (i.e., a screenful) but have only confused screen image for a while. Therefore, data of the first frame is not interframely but intraframely coded and stored. The recommendation H.261 proposes to periodically refresh a system component for preventing error accumulation due to interframe coding and to periodically conduct an intraframe coding of moving picture data. By using this opportunity, a sequence of the data frames are stored with an intraframely coded frame (data) placed at the head thereof. This makes it possible to reproduce video with a rapid feed by thinning the data units (frames) when reproducing the video data stored.

A video storage type communication device which realizes rapid-feed reproduction of images by using periodical refreshment is disclosed in Japanese Laid-Open Patent Publication No. 5-91497. The disclosed device is featured by that whenever a rapid feed control is carried-out, it can start from intraframely coded data, i.e., data of the heading (intraframely coded) frame of interframely coded frames, assuring the synchronized processing visual data and audio data.

The above-mentioned structure of stored data, however, is featured by coexistence of the data necessary for usual reproduction and the data necessary for rapid-feed reproduction. Therefore, it is required to control a storage and data for correctly distinguishing the above-mentioned two kinds of data from each other when reproducing them. Furthermore, the rapid-feed reproduction requires such reproduction control that may select and read only data necessary for rapid-feed reproduction. All these facts may require much complicated data control when storing and reproducing the data. In addition, as mentioned above, periodical refreshment depends upon terminals which have different period of intraframe coding, depriving the storage and communication device of the possibility of controlling a speed of rapid-feed reproduction.

Furthermore, the recommendation H.261 provides that video data coding is conducted on each of blocks into which one frame of video data is divided for encoding, whereas refreshment is conducted on a macroblock consisting of a plurality of the blocks which may not correspond to one frame. Therefore, some terminals may not guarantee that the whole of a frame is intraframely coded.

It is possible to force a terminal to intraframely encode a whole video frame and receive the intraframely coded frame therefrom by sending a signal requesting "fast update" from the video storage type communication device. However, since timing is not defined, the receiving side has to discriminate whether the received frames are intraframely coded or interframely coded by checking all frames one by one macroblock. Data control may be much complicated.

SUMMARY OF THE PRESENT INVENTION

It is an object of the present invention to provide a video storage type communication device which is capable of storing video (moving picture) data and reproducing the stored data by a usual method and by a special method of rapidly forwarding or reversing at a speed selectively adjustable independent of a usable terminal by using its storing and reproducing means which is capable of easily controlling the usually reproducible video data and specially reproducible video data.

It is another object of the present invention to provide a video storage type communication device which is capable of generating, separately from the ordinary reproducible video data, video data to be specially reproducible for example by rapid forwarding and rapid reversing by using a reproducible video generating portion and a second storage portion for storing the specially reproducible video data generated by the specially reproducible video generating portion, and which is also capable of independently operating the ordinarily reproducible video data storage and the specially reproducible video data storage, thereby permitting the relatively free addition and change of their functions.

It is another object of the present invention to provide a video storage type communication device which is capable of easily changing over its operating mode from the ordinary reproducing mode to the specially reproducing mode and vice versa in such a manner that its reproduction control portion switches over two readable storage portions to select required one, thereby making it easier to control the data to be reproduced.

It is another object of the present invention to provide a video storage type communication device which is capable of rapidly reproducing video information in a forward or reverse direction starting from any frame without requiring specially adapted terminals by such a manner that a specially reproducible video generating portion prepares a specially reproducible video data by intraframely encoding restored video (moving picture) data.

It is another object of the present invention to provide a video storage type communication device which is capable of preparing video information by interframely encoding restored video data by its specially reproducible video generating portion, which can be reproduced by rapid feeding at a terminal having a low ability of decoding moving pictures.

It is another object of the present invention to provide a video storage type communication device which is capable of preparing video information consisting of still-picture frames by still-framely encoding restored video data by its specially reproducible video generating portion; the still-framely coded video information, in comparison with the intraframely coded video information, has an increased coding efficiency assuring the possibility of storing a larger amount of data having a higher quality; these still frames can be easily reproducible by rapidly forwarding or reversing like moving pictures even at a terminal having no ability of decoding coded moving pictures.

It is another object of the present invention to provide a video storage type communication device which has a storage control portion for selecting video information from a specially reproducible video generating portion and video information from a receiving portion and storing the selected video information in a storage portion, thereby making it possible to insert and store specially reproducible video information in any position among video information received from a terminal.

It is another object of the present invention to provide a video storage type communication device which has a communication control portion being capable of instructing a storage control portion to select specially reproducible coded video information from a specially reproducible video generating portion at a specified interval, thereby making it possible to store the specially reproducible video information at any desired interval, or making it easier to control a skipping interval when reproducing video information at rapidly forwarding or reversing.

It is another object of the present invention to provide a video storage type communication device which has a reproduction control portion for controlling a call for video information from a video storage portion according to an instruction to be given by a communication control portion, making it possible to switching over reproduction modes (ordinary, rapid forwarding and rapid reversing) and to adjust a speed of rapid forwarding and reversing.

It is another object of the present invention to provide a video storage type communication device which has a specially reproducible video generating portion comprising a decoding portion for decoding coded video data received through a receiving portion and a still-picture coding portion for coding the video information restored by the decoding portion by a still-picture coding method, making it possible to simply reproduce moving picture in forwarding and reversing directions even at a terminal which has no ability of decoding a H.261 class moving picture.

It is another object of the present invention to provide a video storage type communication device provided with an intraframe coding portion for intraframely encoding the restored video (moving picture) data, which can store in separate frames only the intraframely coded video data in a video storage portion, thereby making it possible to process editing, adding, deleting and exchanging data therein.

It is another object of the present invention to provide a video storage type communication device is provided with a video-reproduction control portion for controlling a process of calling for video data from the video storage portion, which can realize selectively switching a video-reproduction mode from a normal reproduction to rapid forwarding or rapid reversing and vice versa and changing a speed of rapid forwarding and rapid reversing.

It is another object of the present invention to provide a video storage type communication device which is capable of decoding the coded video data by a second video-restoring and newly encoding the restored video data by an intraframe coding portion before transmitting for reproduction, thereby transmittable data frames have reduced amount of data than that of intraframely coded frames, assuring much effective use of a communication network.

It is another object of the present invention to provide a video storage type communication device which is capable of decoding the coded video data by a second video-restoring and newly encoding the restored video data by a still-picture coding portion, thereby the obtained still frames can be easily reproduced even at a terminal having no ability of decoding a coded moving picture according to the recommendation H. 261.

PREFERRED EMBODIMENTS OF THE INVENTION

Figure 1:
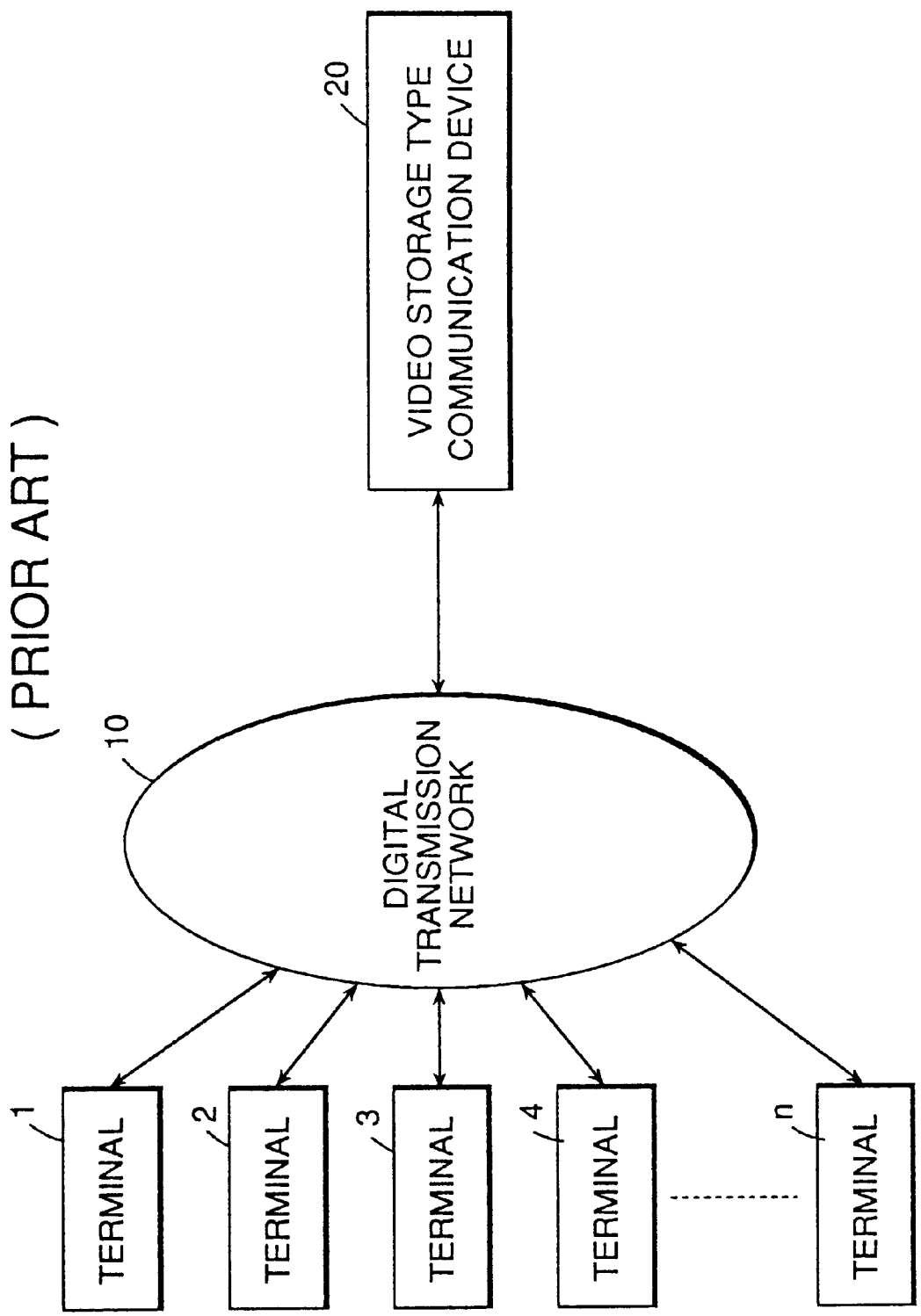
FIG. 1 is a construction view of a video communication system applied to the present invention.
Figure 2:
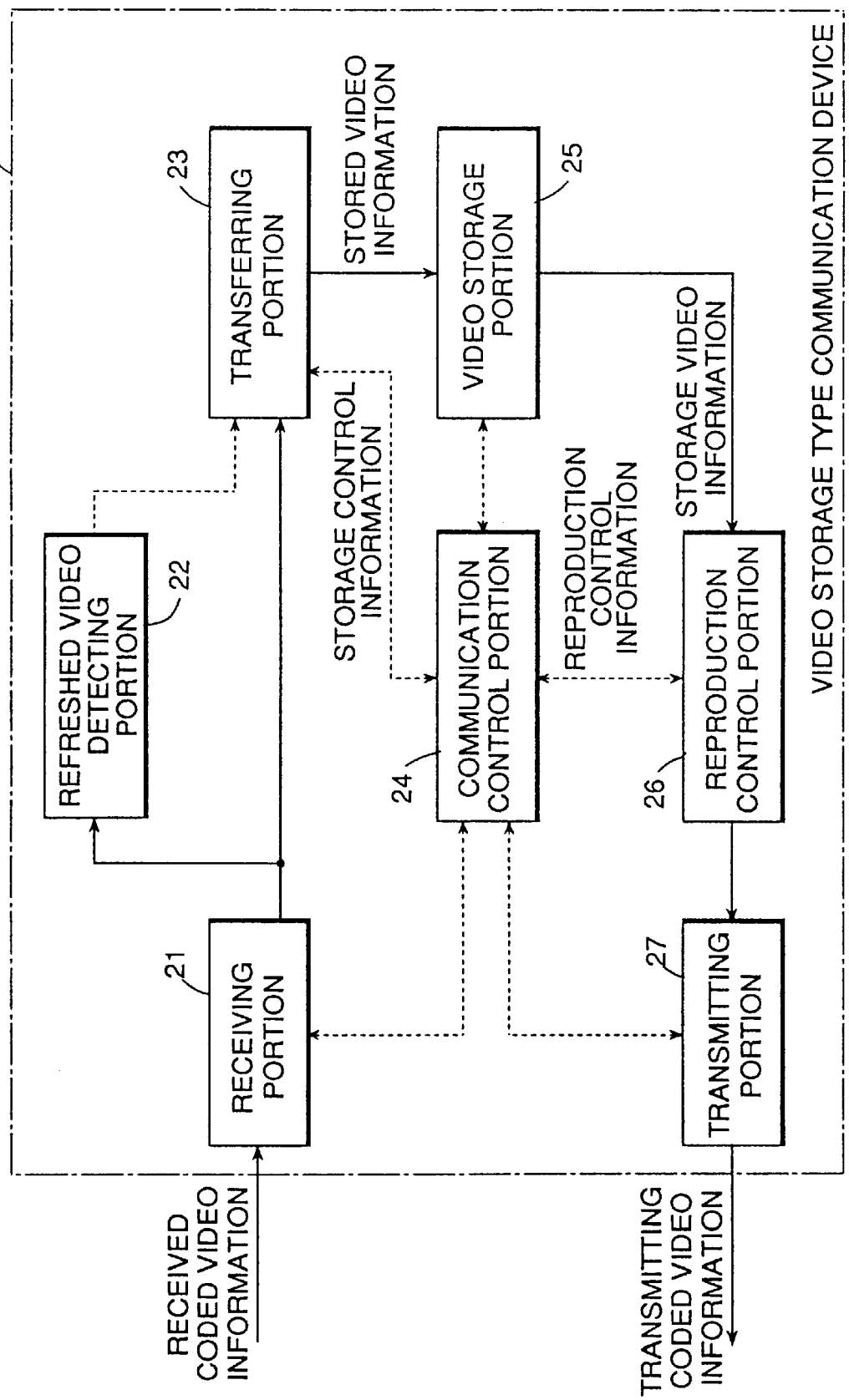
FIG. 2 is a construction view of a conventional video storage type communication device.

FIG. 1 is illustrative of a system of conducting a video-information database service, which includes terminals 1–n, a digital transmission network 10 and a video storage type communication device 20. FIG. 2 is a detailed illustration of the video storage type communication device shown in FIG. 1. As shown in FIG. 2, the video storage type communication device 20 comprises a receiving portion 21, a refreshed picture detecting portion 22, a transferring portion 23, a communication control portion 24, a video storage portion 25, a reproduction control portion 26, transmitting portion 27 and so on. The receiving portion 21 and the transmitting portion 27 are connected to the digital transmission network 10 for communication with the terminals 1–n.

The storage type communication device 20 is intended to be connected with the terminals 1–n which conform to the video coding method H.261 recommended by International Telecommunications Union (ITU).

In the video storage type communication services, it is desired to prepare functions of video reproduction with rapid forwarding or rapid reversing. However, video data coded according to the recommendation H.261 is usually coded by interframe differential coding method and, therefore, consists of differential information. If the first frame data is coded by interframe coding method, each receiving terminal can not restore the frame into a picture (i.e., a screenful) but have only confused screen image for a while. Therefore, data of the first frame is not interframely but intraframely coded and stored. The recommendation H.261 proposes to periodically refresh the video data for preventing error accumulation due to interframe coding and to periodically conduct an intraframe coding of moving picture data. By using this opportunity, the frames of video data are stored in such a way that a frame of intraframely coded video data is placed at the head of a video data sequence. This makes it possible to reproduce video information by rapidly forwarding or reversing by thinning frames at a specified interval.

The above-mentioned periodical refreshment, however, depends upon terminals which may have different period of intraframe coding, depriving the storage type communication device of the possibility of controlling a speed of rapidly feeding reproduction.

Figure 3:
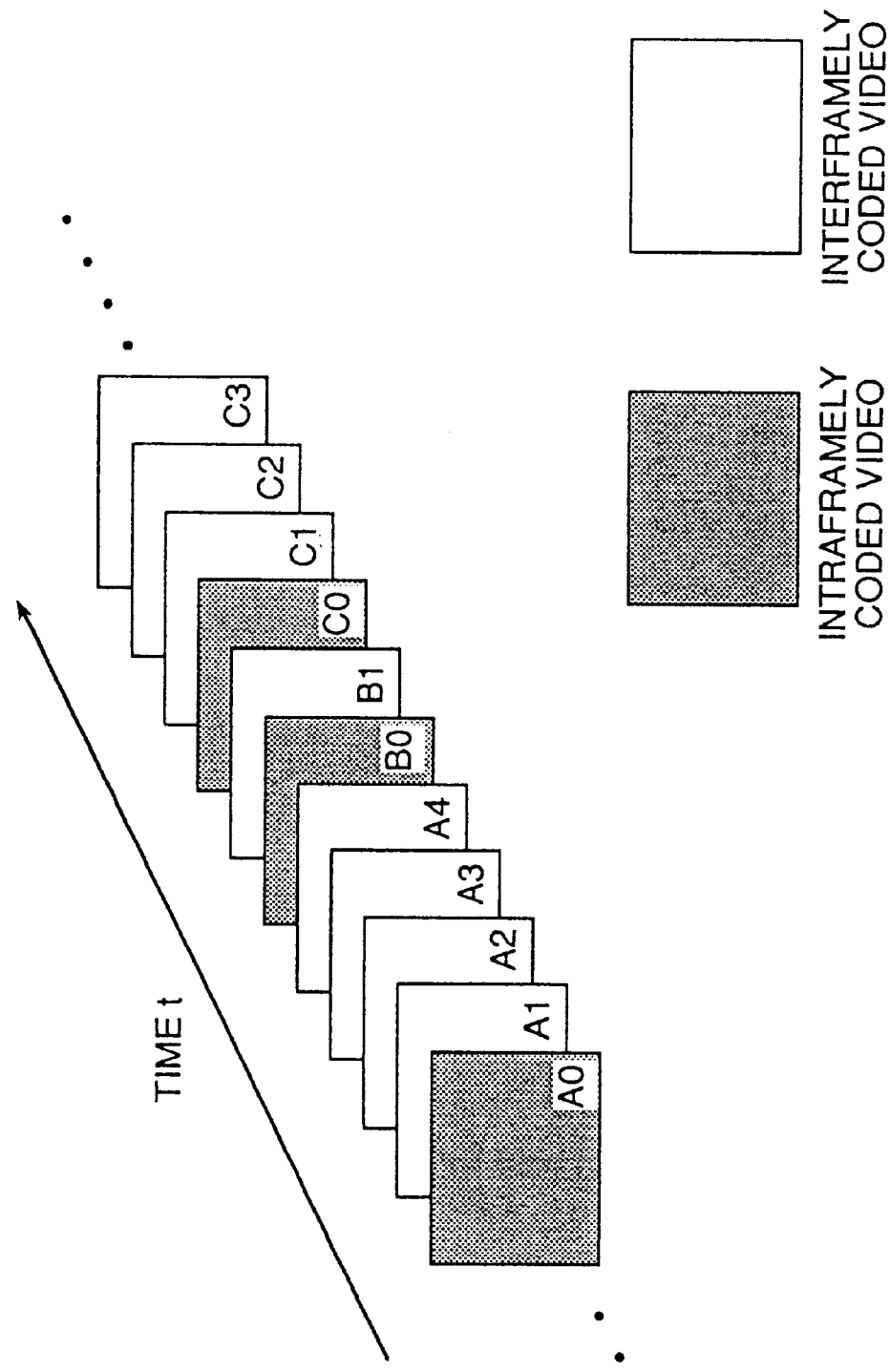
FIG. 3 shows an example of refreshing process in a conventional storage type communication device.

FIG. 3 shows an example of refreshing process in a conventional storage type communication device. At the moment when periodical refreshment is carried-out at a terminal, intraframely coded video data frames A0, B0, C0 and so on are inserted at indefinite intervals. Coded video data is transferred to a terminal in the order of frames A0, B0, C0 and so on when they are reproduced by rapidly forwarding and in the order of frames C0, B0, A0 when they are reproduced by rapidly reversing. Namely, frames are reproduced rapidly but at irregular feeding speed at the terminal. This is undesirable from the view point of the service quality. In view of the foregoing circumstances, the present invention was made to provide a video storage type communication device which has video storing means being capable of storing coded video data received from terminals and reproducing the video data by an ordinary method as well as by a special method, e.g., by rapidly forwarding and reversing at a speed selectively adjustable independent of terminals used.

Figure 4:
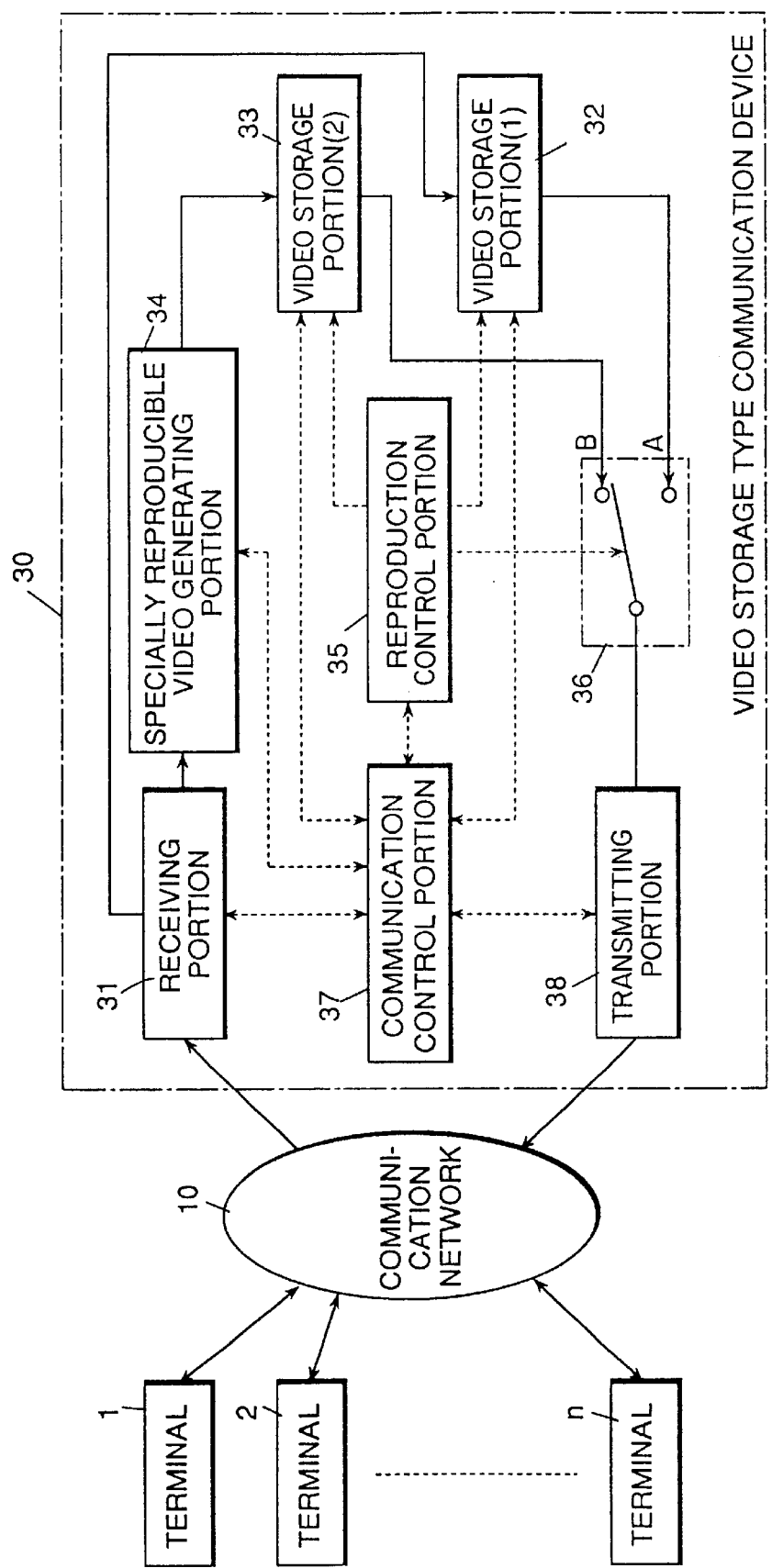
FIG. 4 is a construction view for explaining a video storage type communication device embodying the present invention.

FIG. 4 is a construction view for explaining a video storage type communication device embodying the present invention.

In FIG. 4, 1–n are terminals, 10 is a communication network and 30 is a video storage type communication device according to the present invention. The video storage type communication device 30 trough its receiving portion 31 and transmitting portion 38 is connected with the communication network 10, over which it communicates video data to and from a plurality of the terminals 1–n. The first storage portion 32 has storing media for storing therein coded video data received from the receiving portion 31 according to an instruction to be given by the communication control portion 37. Data to be stored in the first storage portion 32 is interframely coded data A shown in FIG. 6 consisting mainly of coded interframe differential information which has a decreased data amount but is unsuitable for reproduction by rapid forwarding or reversing.

The coded video data from the receiving portion 31 is also transferred to the specially reproducible video generating portion 34 wherein it is converted into specially reproducible video information which is then transferred to the second storage portion 33. Like the first storage portion 32, the second storage portion 33 has storing media for storing therein coded video data generated by the specially reproducible video generating portion 34 according to an instruction to be given by the communication control portion 37.

The video data stored in the first storage portion 32 and the video data stored in the second storage portion 33 are read out by the reproduction control portion 35. The video data is read from the first storage portion 32 for ordinary reproduction while the video data is read from the second storage portion 33 for special reproduction. At the same time, the reproduction control portion 35 operates the reproduction selector switch 36 so that it selects the data required to be transferred to the transmitting portion 38. The transmitting portion 38 receives the data from the first storage portion 32 or the second storage portion 33 and transmits the data to the terminals 1–n over the communication network 10.

Figure 5:
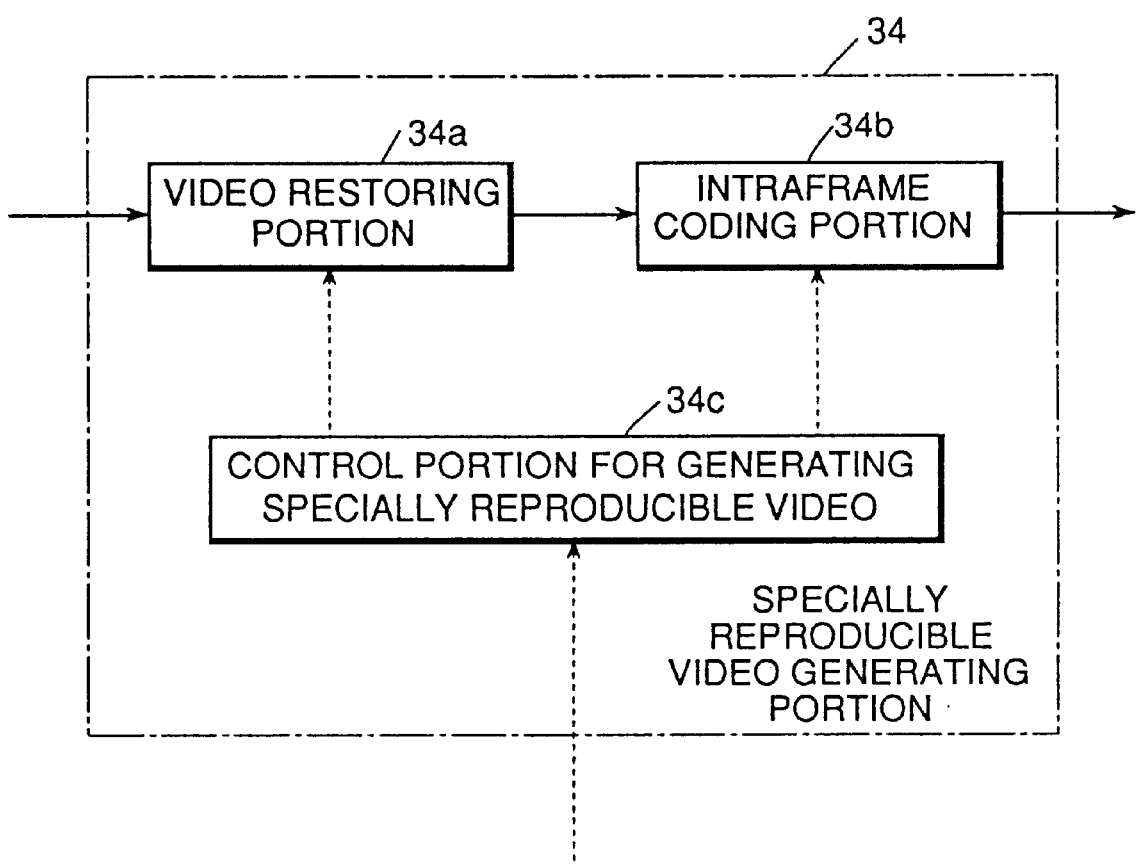
FIG. 5 is a construction view of a specially reproducible video generating portion shown in FIG. 3.

FIG. 5 is illustrative of a specially reproducible video generating portion shown in FIG. 4. In FIG. 5, there is shown a specially reproducible video generating portion 34 including a video restoring portion 34a, an intraframe coding portion 34b and a specially reproducible video generation control portion 34c. The video restoring portion 34a restores video data by successively decoding coded video data received through the receiving portion 31. The intraframe coding portion 34b intraframely encodes the video data restored by the video restoring portion 34a. The control portion 34c for generation of specially reproducible video data performs control operations for generation of specially reproducible video data, e.g., selection of frames to be intraframely encoded. By applying another coding portion having another encoding means, e.g., still-picture coding means in addition to the intraframe coding portion 34b, it is possible to adapted to various kinds of coding formats.

Figure 6:
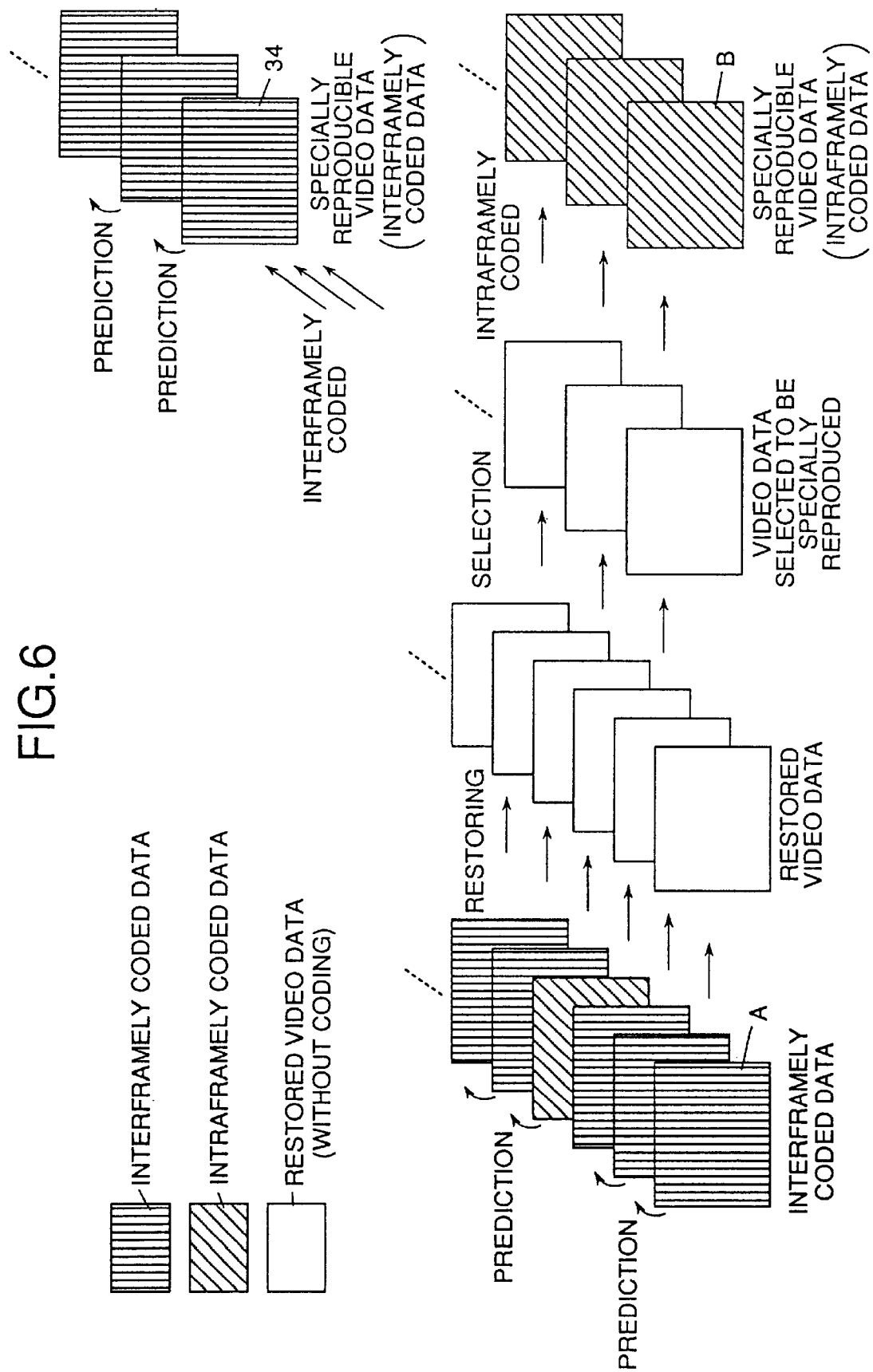
FIG. 6 shows a correlation between received data and stored data.

With the thus constructed specially reproducible video generating portion, video data to be stored in the second video storage portion 33 is such that the received coded video data is thinned off frames at a specified interval and encoded, in form of, e.g., intraframely coded data B shown in FIG. 6. In comparison with the interframely coded data A, the intraframely coded data B has a larger amount of data per frame but frames are independent and, therefore, can be reproduced with no disturbance despite the order of reading them. When these video frames are read and transmitted in the order of storing, they can be rapidly reproduced at terminals. On the other hand, when these video frames are read and transmitted in the reverse order, they can be rapidly reproduced in the reverse direction.

As described above, a heading video data is desired to be intraframely coded frame. Accordingly, even in ordinary reproduction, only a frame to be first reproducible is read from the second storage portion and reproduced and, then, the second and succeeding frames are obtained from the first storage portion and reproduced.

If there is video information that is previously known to be reproduced only in ordinary mode or desired not to be rapidly reproduced, all component frames except the heading one are not subjected to decoding, intraframe coding and storing into the second storage portion. This may save unnecessary use of memory capacity of the second storage portion, thereby assuring effective use of its storing media.

Since video information stored in the second storage portion 33 consists of intraframely coded data which is separated per frame, it permits relatively easy processing for edition, addition, deletion and exchange of the data as may be required.

Figure 7:
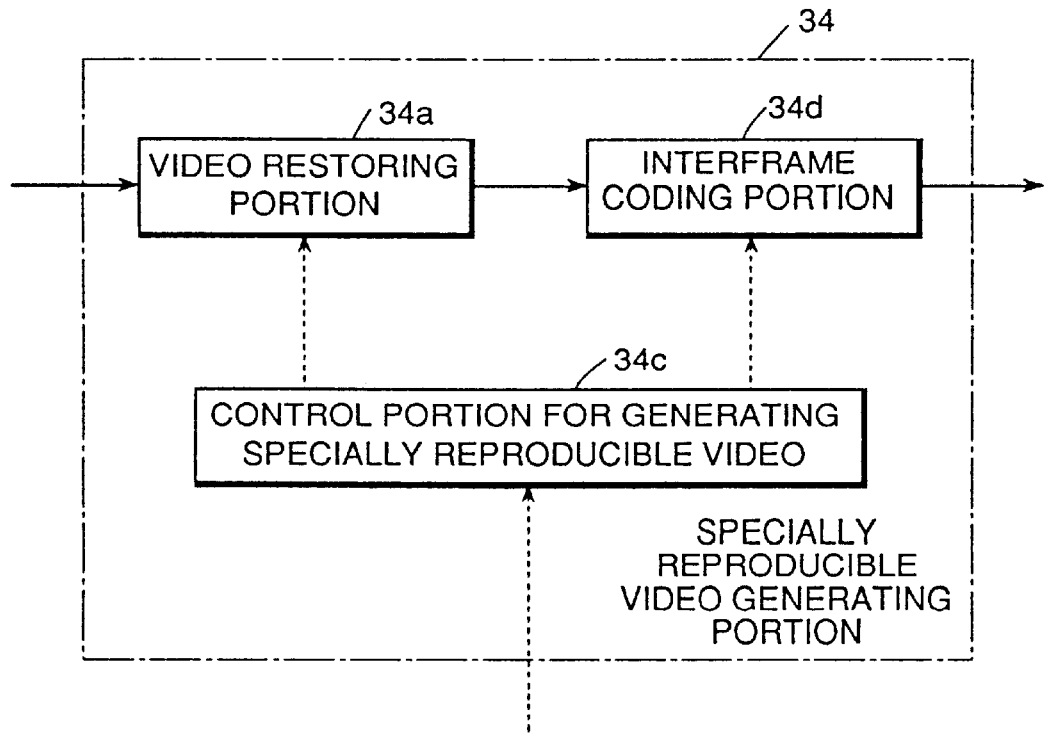
FIG. 7 is a construction view of another example of specially reproducible video generating portion according to the present invention.

FIG. 7 is a construction view of another example of a specially reproducible video generating portion. The specially reproducible video generating portion 34 includes a video restoring portion 34a, an interframe coding portion 34d and a specially reproducible video generation control portion 34c. The video restoring portion 34a restores video data by successively decoding coded video data received through the receiving portion 31 of FIG. 4. The interframe coding portion 34d interframely encodes the video data restored by the video restoring portion 34a. The control portion 34c for generation of specially reproducible video data performs control operations for generation of specially reproducible video data, e.g., selection of frames to be interframely encoded.

With the thus constructed specially reproducible video generating portion, the interframely coded video data may be adapted only for rapid reproduction, but video information to be reproduced is obtained by thinning frames of the received coded video data and, therefore, may be reproduced at a terminal having a low ability of decoding video (moving picture) data. As compared with the above-mentioned first example, the interframe coded data is smaller size per frame in storage, resulting in saving storing media of the storage portion.

Figure 8:
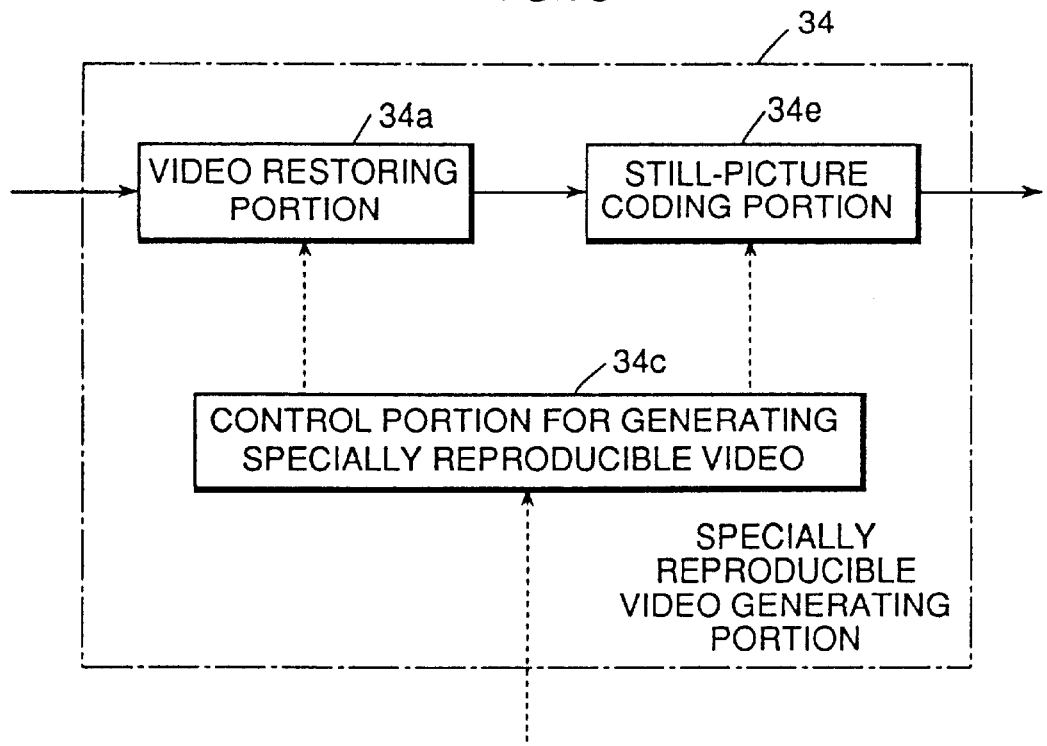
FIG. 8 is a construction view of a further example of specially reproducible video generating portion according to the present invention.

FIG. 8 is a construction view of a further example of a specially reproducible video generating portion. The specially reproducible video generating portion 34 includes a video restoring portion 34a, a still-picture coding portion 34e and a specially reproducible video generation control portion 34c. The video restoring portion 34a restores video data by successively decoding coded video data received through the receiving portion 31 of FIG. 4. The still-picture coding portion 34e encodes the video data restored by the video restoring portion 34a into a still picture (frame). The control portion 34c for generation of specially reproducible video data performs control operations concerning generation of specially reproducible video data, e.g., selection of frames to be encoded by still-picture coding method.

An ordinary algorithm of coding a still-picture is defined by the recommendation T.81 of ITU.

With the thus constructed specially reproducible video generating portion, an obtainable coded still-picture frame in comparison with the intraframely or interframely coded video data has a larger amount of data per frame but is reproducible as simply moving pictures at a terminal which can not decode coded data of moving pictures or at a display directly connected with the video storage and communication device. The still coded frames can be reproduced in forwarding and reversing directions because they do not correlate with each other.

The application of a coding portion having still-picture coding means together with the aforementioned intraframe and interframe coding portions makes it possible to comply with various kinds of coded formats.

Figure 9:
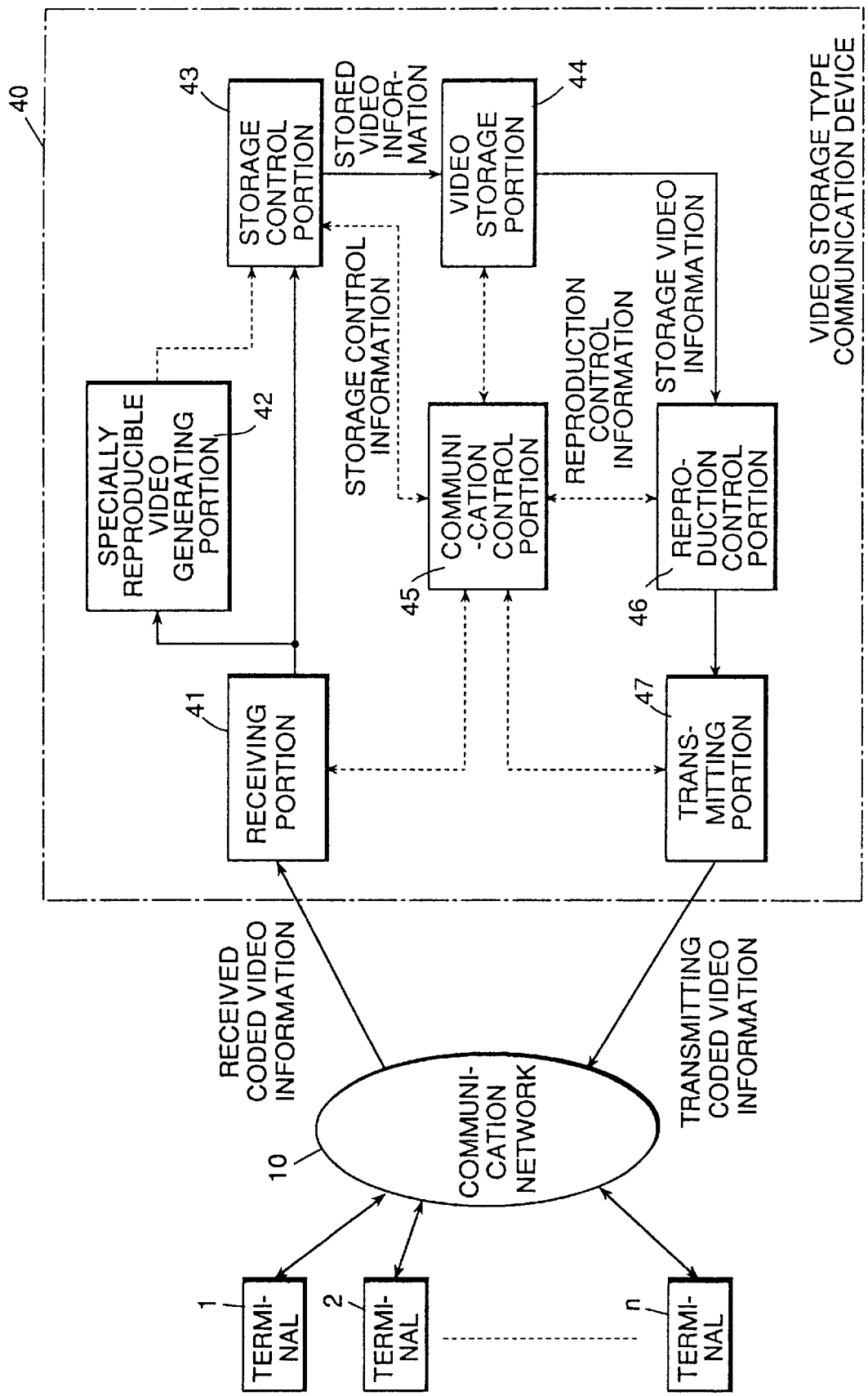
FIG. 9 is a construction view for explaining a video storage type communication device embodying the present invention.

FIG. 9 is a construction view for explaining another embodiment of video storage type communication device according to the present invention.

The video storage type communication device 40 through its receiving portion 41 and transmitting portion 47 is connected with the communication network 10, over which it communicates video data to and from a plurality of terminals 1–n.

The coded video data received by the receiving portion 41 is transferred to the specially reproducible video generating portion 42 and the storage control portion 43 under the control of a communication control portion 45. The coded video information is conventional video data encoded by a hybrid coding method that is a combination of motion compensative interframe prediction coding and intraframe orthogonal transformation coding.

Figure 10:
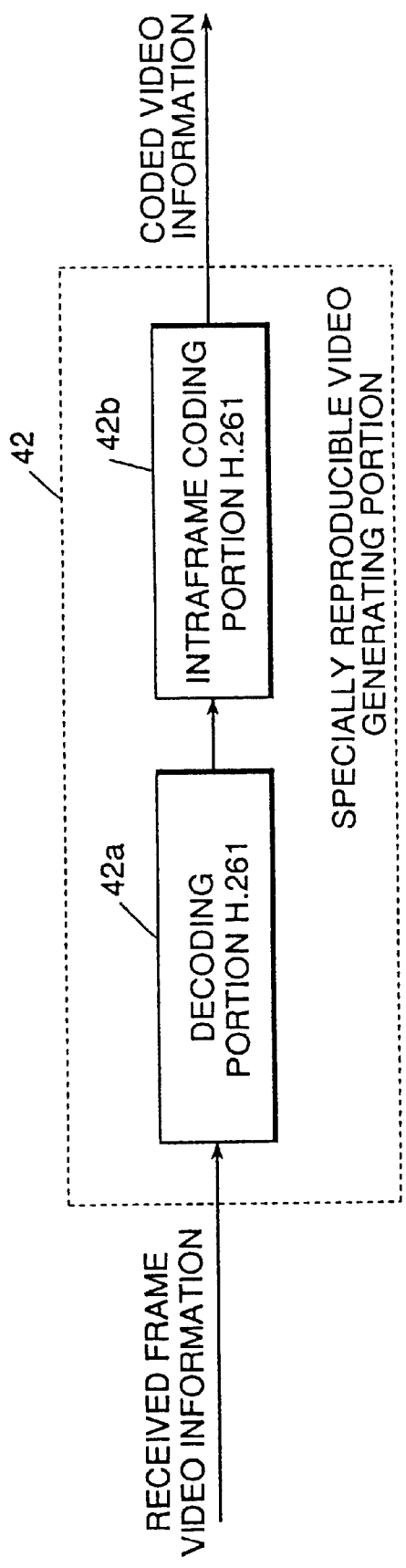
FIG. 10 is a construction view of an embodiment of a specially reproducible video generating portion shown in FIG. 9.

As shown in FIG. 10, the specially reproducible video generating portion 42 consists of a decoding portion (H.261) 42a and an intraframe coding portion (H.261) 42b and successively decodes coded video data received through the receiving portion 41 to restore video information. At this time, like a usual H.261 type decoder, the decoding portion 42a performs processing operations such as motion compensative interframe prediction decoding and reverse DCT (Discrete Cosine Transform). The video data restored by the decoding portion 42a according to the recommendation H. 261 is then encoded only in the intraframe mode defined in the recommendation H. 261 by the intraframe coding portion 42b from which the coded video information is outputted.

Accordingly, the specially reproducible video generating portion (H. 261) 42 has no need for performing the interframe prediction coding, being relieved of motion compensative prediction processing which is considered as main processing load for an ordinary H.261 type coder. It is also relieved of necessity for having frame memory for that purpose. Namely, the portion 42 has to perform very simple processing operations, just like a still-picture decoder, and, therefore, has a simple hardware.

Figure 11:
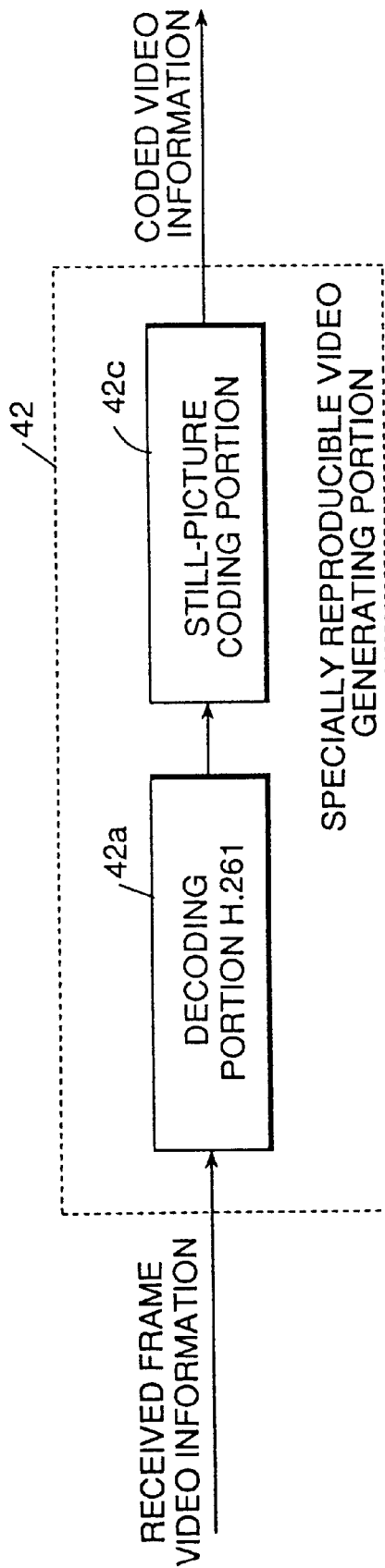
FIG. 11 is a construction view of another embodiment of specially reproducible video generating portion shown in FIG. 9.

FIG. 11 illustrates another example of a specially reproducible video generating portion 42 which comprises a decoding portion (H. 261) 42a and a still-picture coding portion 42c. The decoding portion (H.261) 42a successively decodes coded video data received through the receiving portion 41 (FIG. 4) to restore video information. At this time, like a usual H.261 type decoder, the decoding portion 42a performs processing operations for motion compensative interframe prediction decoding and reverse DCT (Discrete Cosine Transform). The still-picture coding portion 42c encodes the restored video information by applying a still-picture coding algorithm defined in the recommendation T.81 of ITU.

With the thus constructed specially reproducible video generating portion, obtainable still-frames of coded video data in comparison with the intraframely or interframely coded video data have a larger amount of data per frame but are reproducible as simple moving pictures at a terminal which can not decode coded data of normal moving pictures or a display directly connected with the video storage type communication device. This can be realized by controlling the reproduction control portion 46 so as to send only coded still-frames to the terminal or the display when reproducing the video data.

The application of the coding portion having still picture coding means together with the aforementioned intraframe coding portion makes it possible to comply with various kinds of coded formats.

The communication control portion 45 provides the storage control portion 43 with control information necessary for starting and finishing the storage operation and distinguishing which kind of video information is stored—received frame video information or coded video information.

Figure 12:
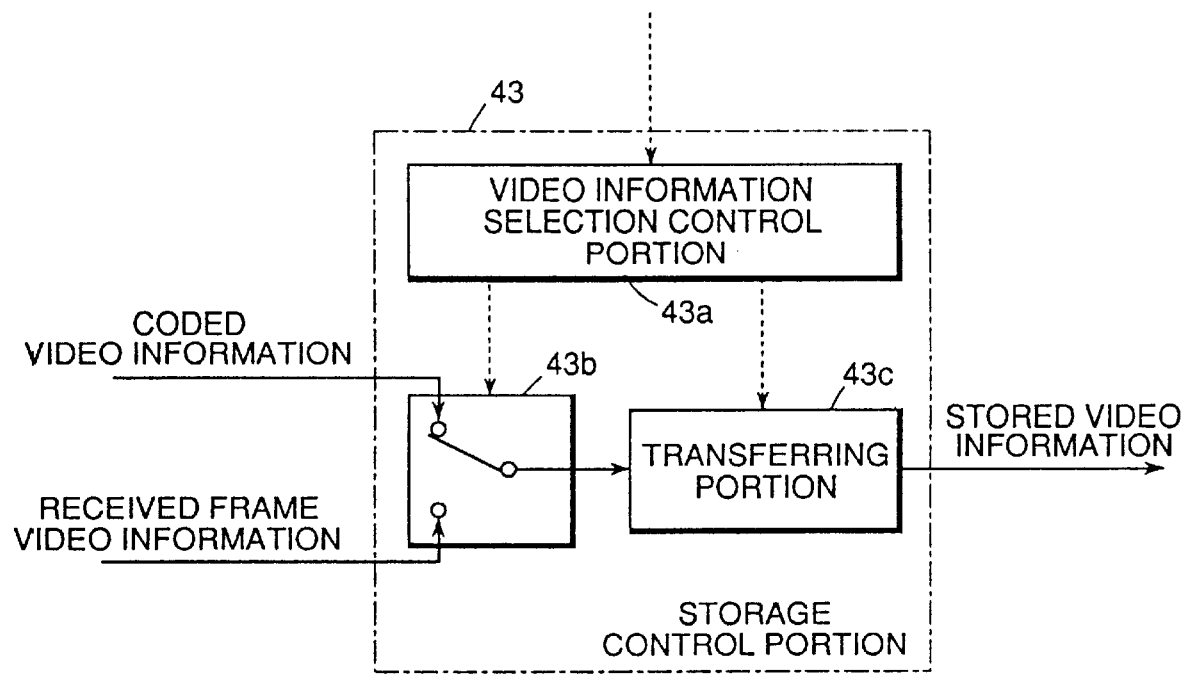
FIG. 12 is a construction view of an exemplified storage control portion shown in FIG. 9.

Referring to FIG. 12, the storage control portion 43 consists of a video information selecting control portion 43a, a selector switch 43b and a transferring portion 43c, According to control information from the communication control portion 45 for starting, ending and storing received frame video information or coded video information, the storage control portion 43 selects the received frame video information from the receiving portion 41 or the coded video information from the specially reproducible video generating portion 42 by operating the selector switch 43b, and transfers the selected video information together with additional information indicating, e.g., intraframe or interframe mode of the storable data to the video storage portion 44 for storing the information therein.

Figure 13:
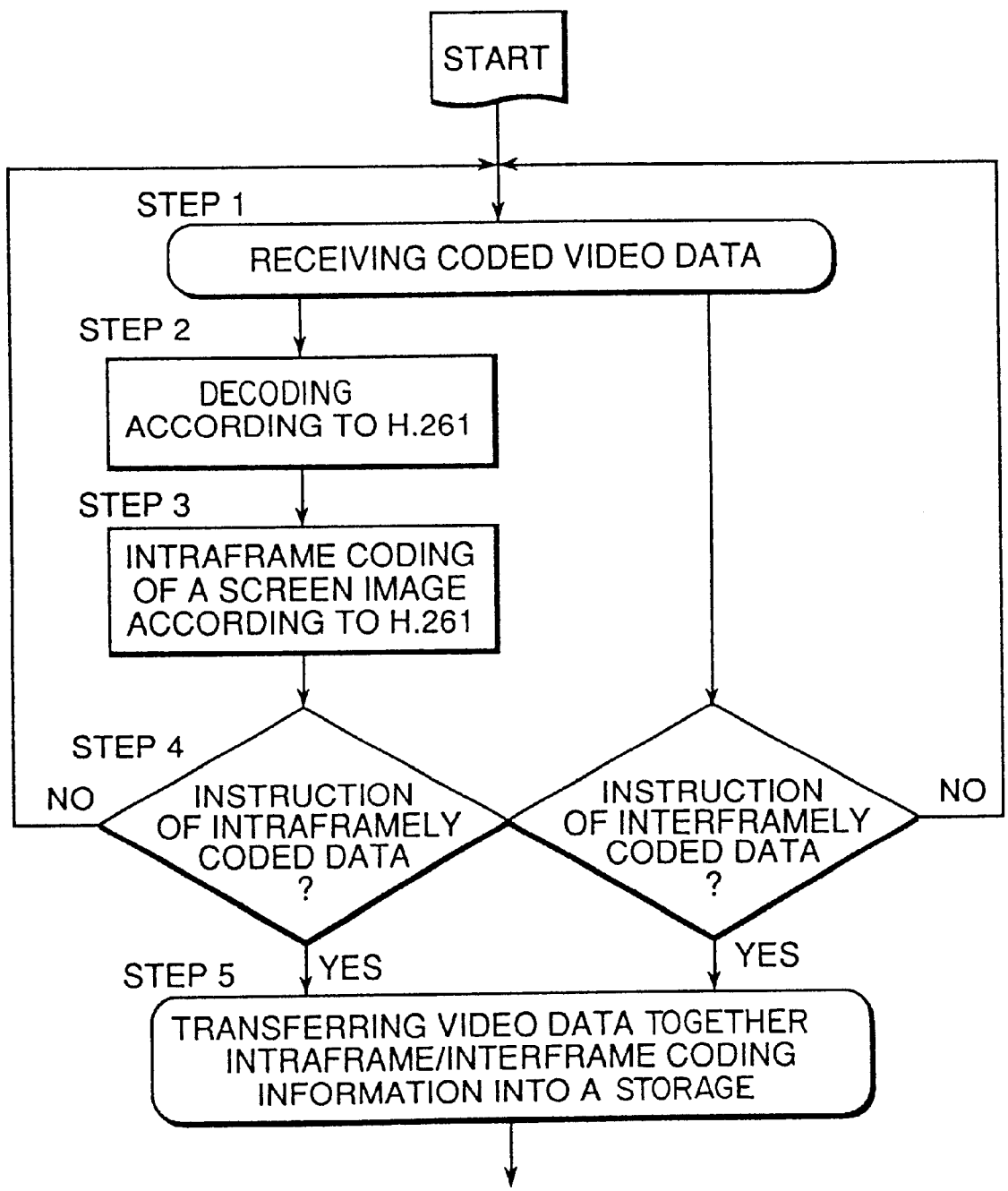
FIG. 13 is a flow chart of video data for explaining the operation of the storage type communication device.

FIG. 13 is a flow chart for explaining the operation of the video storage type communication device embodying the present invention. Coded video data from a terminal is received by the receiving portion 41 (Step 1) and then transferred to the specially reproducible video generating portion 42 and the storage control portion 43.

In the specially reproducible video generating portion 42, the coded video data is decoded by the H.261 type decoding portion 42a (Step 2) and stored in a frame memory thereof. The video frames (screenfuls) are read from the frame memory of the H.261 type decoding portion 42a and are intraframely coded by the H.261 type intraframe coding portion 42b (Step 3). The intraframely coded video data frames outputted from the H.261 type intraframe coding portion 42b are transferred to the storage control portion 44.

The storage control portion 43 determines which coded video data—intraframely coded video data (output of the specially reproducible video generating portion 42) or interframely coded video data (output of the receiving portion 41) is transferred to the video storage portion 44 according to an instruction given by the communication control portion 45 (Step 4). When the instruction from the communication control portion 45 indicates storing intraframely coded video data, the coded video data is complemented with an information indicating the data being intraframely coded data and, then, transferred to the video storage portion through the transferring portion 43c. With the instruction indicating storing interframely coded video data, the coded video data with information indicating the data being interframely coded data is transferred to the video storage portion through the transferring portion 43c. (Step 5)

The communication control portion 45 directs the storage control portion 43 not to store video data when said data is not required; to store video data coded in interframe mode when storing interframely coded data; and to store video data coded in intraframe mode when storing intraframely coded data. The communication control portion may request storing video data intraframe mode or interframe mode at desired intervals.

Figure 14:
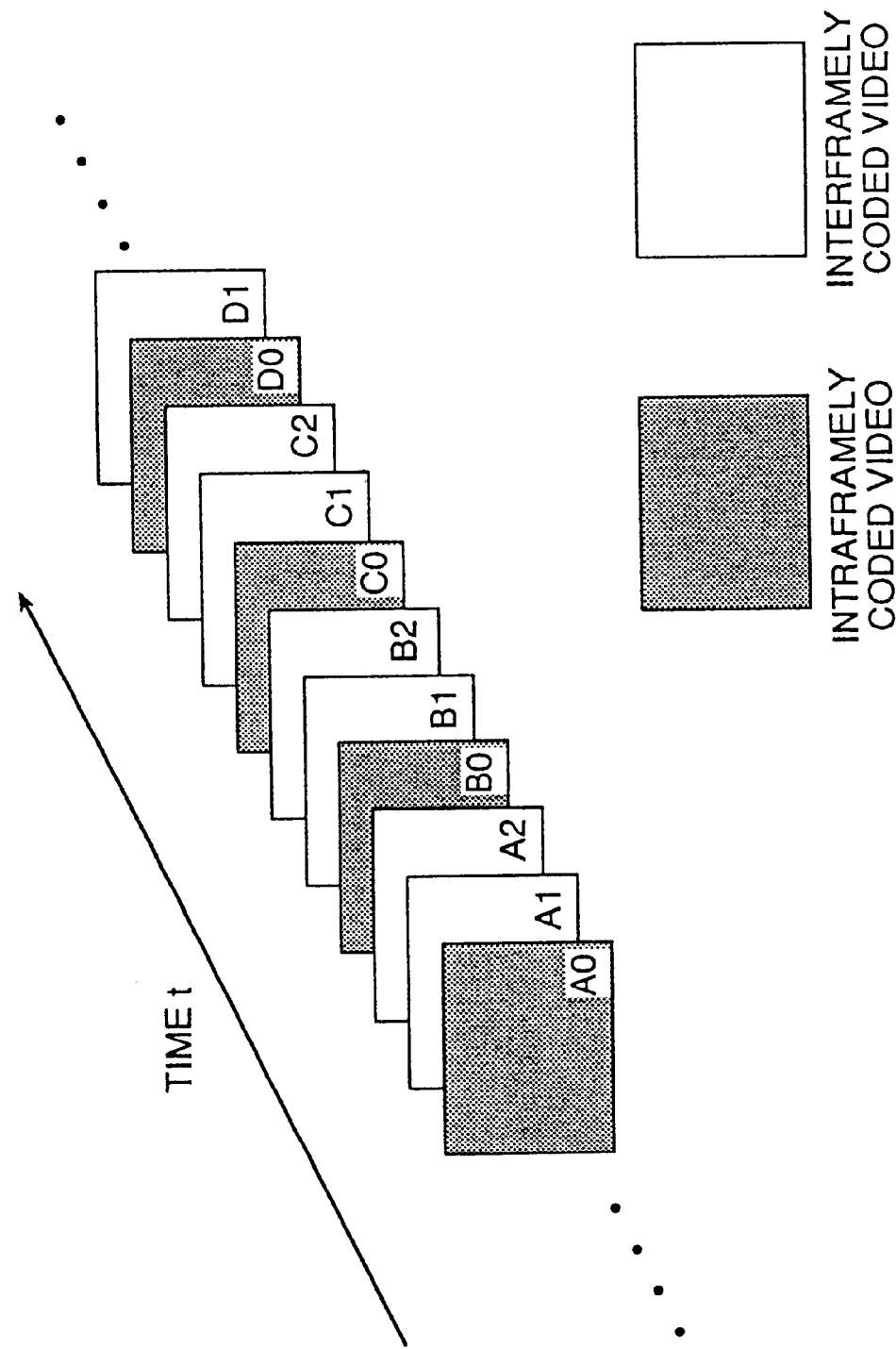
FIG. 14 is illustrative of stored video frames in a storage type communication device according to the present invention.

FIG. 14 shows an example of storing coded video data from a terminal into a storage by using the video storage type communication device according to the present invention. For easier understanding, such a case is described that coded data from the terminal can be transmitted at a constant frame rate (the number of frames to be transmitted per second). In case of FIG. 14, video data coded in the intraframe mode is inserted at a specified interval. Frames A0, B0, C0 and D0 are of intraframely coded video data. Frames A1–A2, B1–B2, C1–C2 and D1 are of interframely coded video data. In the shown case, the frames of intraframely coded video data are inserted among the frames of interframely coded video data at an interval of 1:3.

In reproduction of the stored video data, the communication control portion 45 directs the video storage portion 44 to read-out the stored coded video data therefrom. The communication control portion 45 also gives the reproduction control portion 46 a reproduction control information necessary for ordinary reproduction or reproduction by rapidly forwarding or by rapidly reversing (e.g., reproducible stored coded video data, direction relative to time axis, the number of frames per unit time for skipping reproduction). According to the information given by the communication control portion 45, the reproduction control portion 46 reads the required coded video data from the storage portion 44 and transferred the data to the transmitting portion 47 which in turn transmits the received coded video data to the terminal.

Referring to FIG. 14, the stored coded video data is transmitted to a terminal whereat it is reproduced in an ordinary mode, rapidly forwarding mode or rapidly reversing mode.

In the ordinary reproduction, it is possible to transfer frames of intraframely coded video data and frames of video data coded by the motion compensative interframe prediction coding method. Therefore, frames A0, A1, A2, B0, B1, B2, C0, C1, C2. D0, D1 can be transmitted in the described order to the terminal.

In reproduction by rapidly forwarding, the frames of video data coded by the motion compensative interframe prediction coding method can not be transmitted to the terminal because the latter can not correctly perform predicted compensation. Therefore, only frames of intraframely coded video data are transmitted in the order of A0, B0, C0, D0 or A0, C0 and so on to the terminal.

In reproduction by rapidly reversing, like the reproduction by rapidly forwarding, only frames of intraframely coded video data are transmitted but in the reversed order of D0, C0, B0, A0 or D0, B0 and so on to the terminal.

Figure 15:
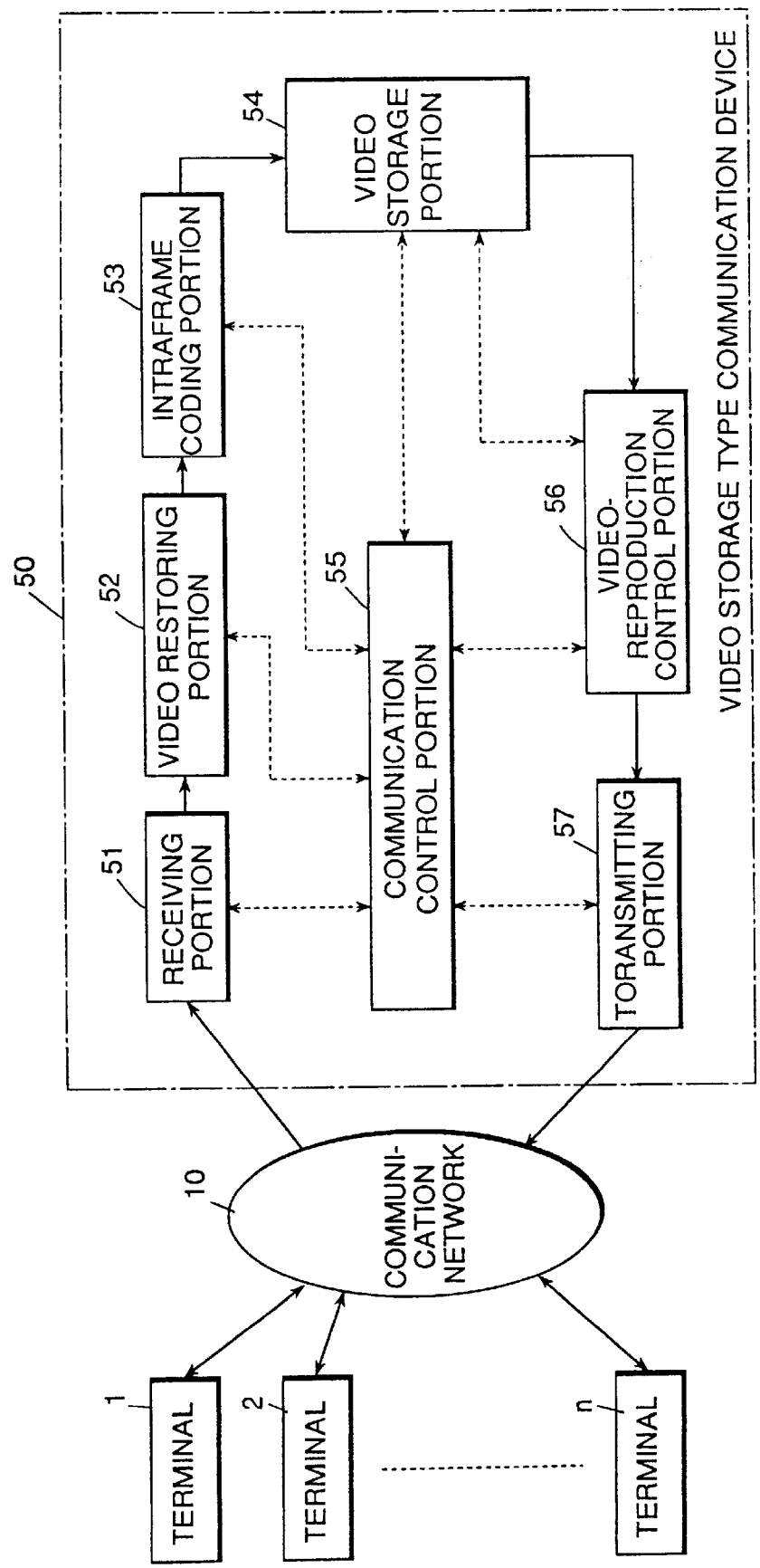
FIG. 15 is a construction view of a video storage type communication device embodying the present invention.

FIG. 15 is a construction view for explaining a video storage type communication device embodying the present invention.

A video storage type communication device 50 is connected at its receiving portion 51 and transmitting portion 57 with a communication network 10 over which it transmits video data to and from a plurality of the terminals 1–n.

The video restoring portion 52 restores video (moving picture) data by successively decoding coded video data received through the receiving portion 51. The intraframe coding portion 53 intraframely encodes the video data restored by the video restoring portion 52. A video storage portion 54 has data storing media and stores the video data transferred from the intraframe coding portion 53 according to an instruction given by a communication control portion 55.

The video data stored in the video storage portion 54 is read-out therefrom by the video-reproduction control portion 56. According to an instruction of the communication control portion 55, the video-reproduction control portion 56 successively reads coded video frames in the order of their storing in the storage portion 54 when they are to be ordinarily reproduced, whereas it reads the frames at a certain interval in the forward or reverse order when they are to be reproduced by rapidly forwarding or reversing. The transmitting portion 57 receives the video data transferred from the video-reproduction control portion 56 and transmits the received video data over the communication network 10 to terminals 1–n.

Figure 16:
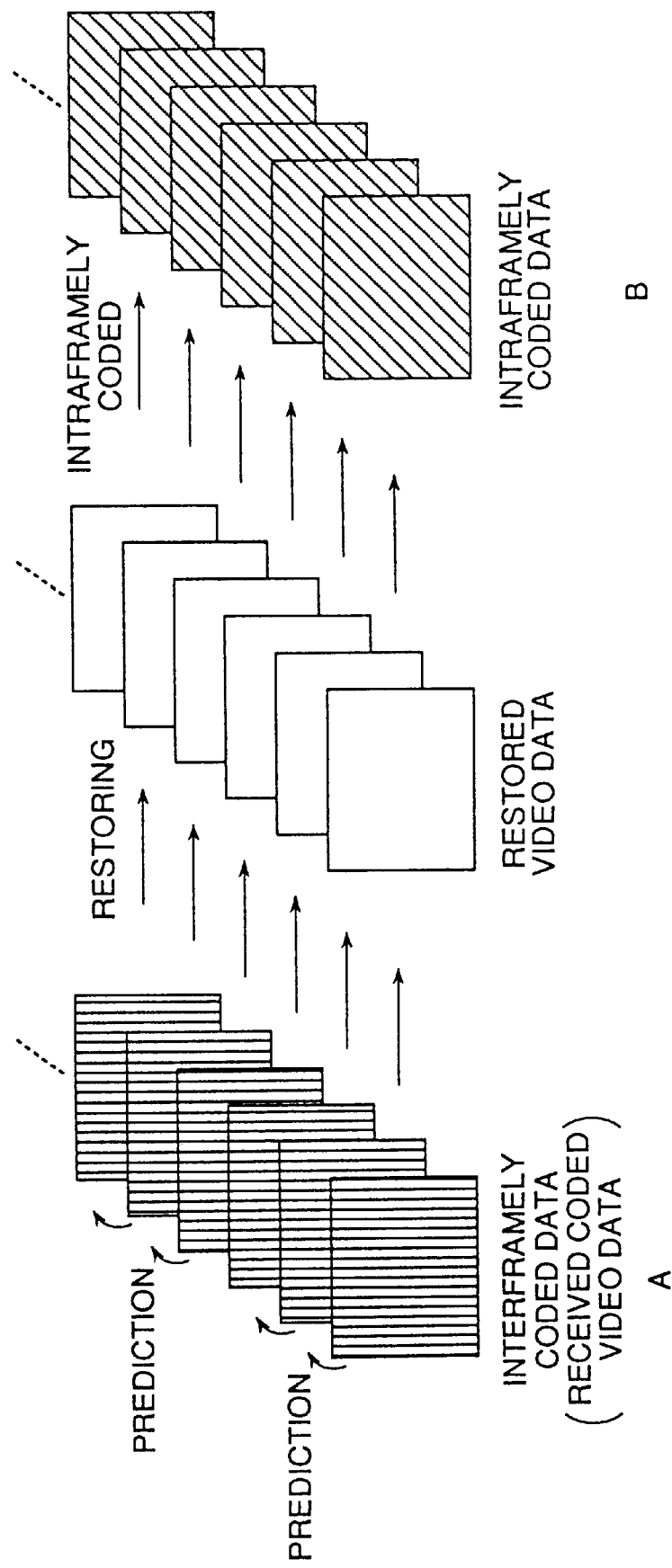
FIG. 16 is a view showing a correlation between received data and stored data.

In the thus constructed video-storage type communication device, video data stored in the video storage portion 54 is intraframely coded frames B shown in FIG. 16, which, in comparison with received coded video data, i.e., interframely coded frames A, have a larger amount of data per frame and can be read out in any order and be surely reproduced at any terminal because the frames have no correlation between their contents (data). When these frames reads-out in the order of storing at a certain interval and transmitted, they are reproduced in rapid forwarding mode at the terminals. When the frames read-out in the reversed order at a certain interval, they are reproduced in rapid reverse mode at the terminals. The stored frames are independent from each other and may be processed separately, making it easier to edit, add, delete and exchange components as the need be.

Figure 17:
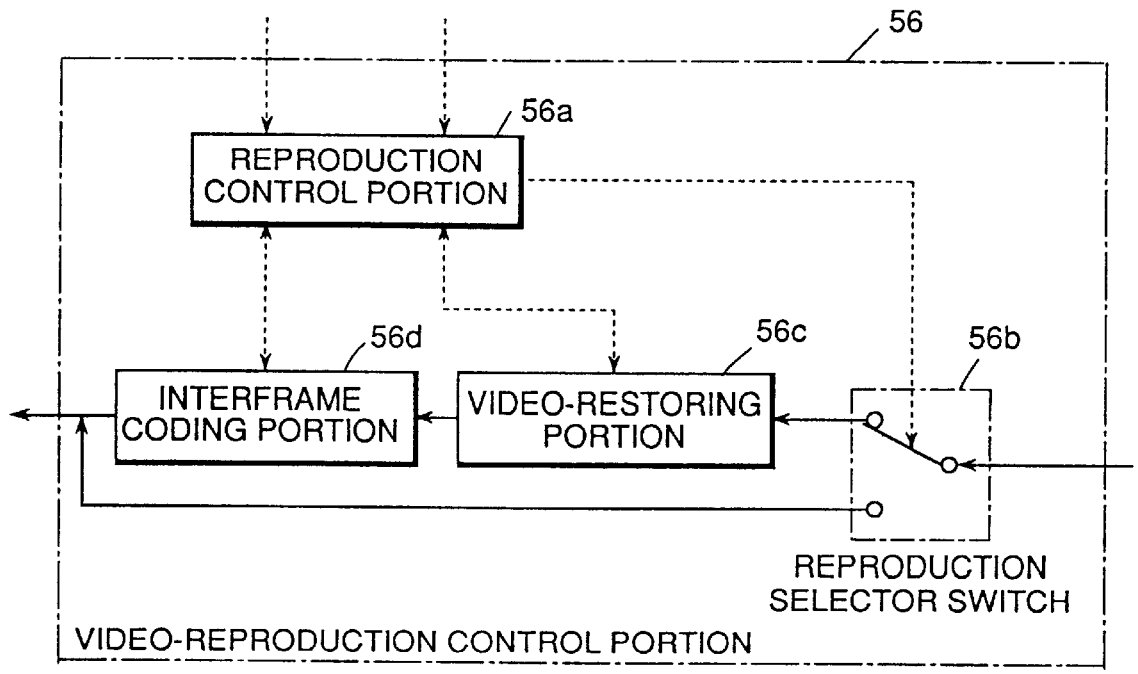
FIG. 17 is a construction view of another example of a video-reproduction control portion according to the present invention.

FIG. 17 is a construction view of another embodiment of a video storage type communication device according to the present invention. In FIG. 17, numeral 56 designates a video-reproduction control portion which is composed of a reproduction control portion 56a, a reproduction selector switch 56b, a second video-restoring portion 56c and an interframe coding portion 56d.

The second video restoring portion 56c, like the video restoring portion 52 of FIG. 15, restores video (moving picture) by successively decoding coded video data from a video storage portion 51. The interframe coding portion 56d interframely encodes the video data restored by the second video-restoring portion 56c. The reproduction control portion 56a controls a calling interval of the video frames from the video storage portion 54 and effects the reproduction selector switch 56b to select the necessity or non-necessity of newly encoding the read-out video data. The reproduction control portion 56a also executes control operations on the above-mentioned portions for reproduction of the video data.

With the thus constructed video-reproduction control portion, all frames except the first frame can be decoded and newly encoded by the second video-restoring portion 56c and the interframe coding portion 56d respectively before transmitting for reproduction in ordinary or rapid forwarding or rapid reversing mode. By so doing, the frames (except the first one) to be transmitted become to have a reduced amount per frame as compared with the embodiment of FIG. 15 whereby the intraframely coded frames B (FIG. 16) obtained from the video storage portion 54 are transmitted. Namely, the shown embodiment can much effectively use the communication network.

Figure 18:
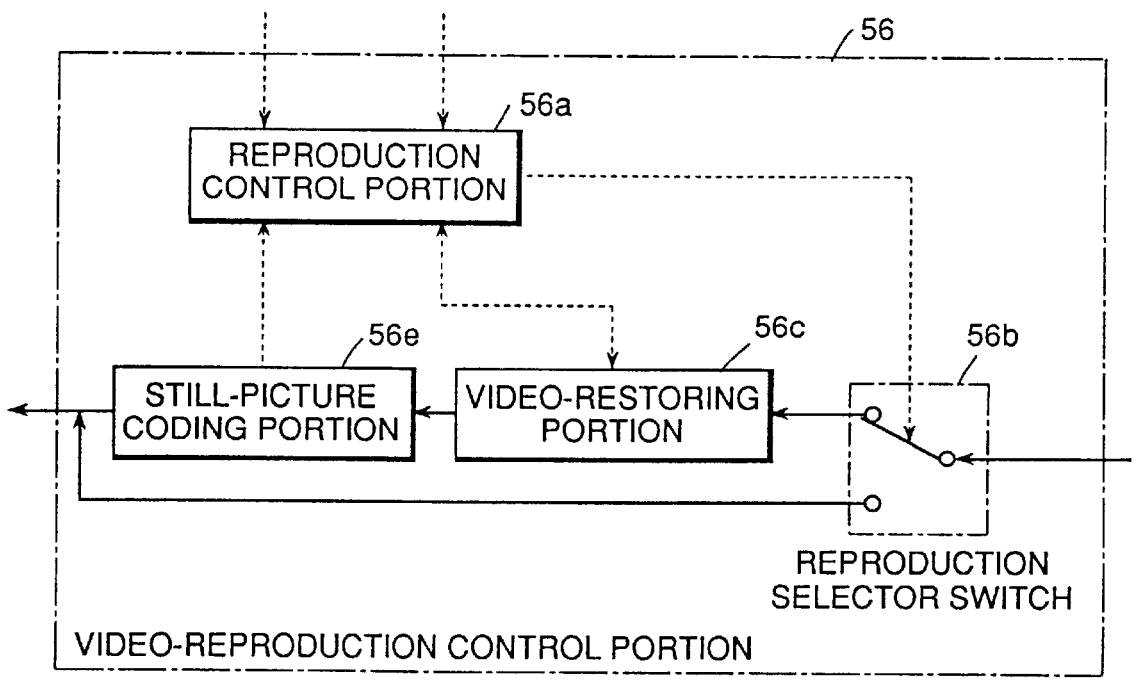
FIG. 18 is a construction view of a further example of a video-reproduction control portion according to the present invention.

FIG. 18 is a construction view of another embodiment of a video storage type communication device according to the present invention. In FIG. 18, numeral 56 designates a video-reproduction control portion which is composed of a reproduction control portion 56a, a reproduction mode selector switch 56b, a second video-restoring portion 56c and a still-picture coding portion 56e.

The second video restoring portion 56c, like the video restoring portion 52 of FIG. 15, restores video (moving picture) by successively decoding coded video data from a video storage portion 54. The still-picture coding portion 56e receives the video data restored by the second video-restoring portion 56c and encodes the received video data frame by frame to obtain still-picture frames. An ordinary algorithm of coding a still-picture is defined by the recommendation T.81 of ITU, (International Telecommunication Union). The reproduction control portion 56a controls a calling interval of the video frames from the video storage portion 54 and effects the reproduction selector switch 56b to select the necessity or non-necessity of newly encoding the read-out video data. The reproduction control portion 56a also performs control operations on the above-mentioned portions for reproduction of the video data.

With the thus constructed video-reproduction control portion 56, obtainable coded still-picture frames in comparison with the intraframely or interframely coded video frames have a larger amount of data per frame but are reproducible as a simplified moving picture at a terminal having no ability of decoding coded moving pictures or at a video display set directly connected with the video storage type communication device. The still-picture coded frames can be reproduced in both (forward and reverse) directions because they do not correlate with each other.

The application of a coding portion having still-picture coding means together with the aforementioned interframe coding portions makes it possible to comply with various kinds of coded formats.

What is claimed is:

1. A video storage and communication device used for a video information communication system to distribute video data to a terminal set connected with a communication channel, the communication device comprising:
   a first video storage portion for storing a first coded video data;
   a video generating portion for generating a second coded video data different from the first coded video data by re-encoding the first coded video data;
   a second video storage portion for storing the second coded video data generated by the video-generating portion, wherein said first and second video storage portions are separate and distinct from one another;

a video-reproduction control portion for selecting the first coded video data stored in the first video storage portion or the second coded video data stored in the second video storage portion; and a transmitting portion for transmitting the first coded video data or the second coded video data selected by the video-reproduction control portion over the communication channel, wherein the first coded data and the second coded data are separate from and independent of one another.

2. A video storage and communication device according to claim 1, wherein the video-generating portion generates the second coded video data having a reduced number of video frames as compared with the first coded video data.

3. A video storage and communication device according to claim 2, wherein the video-generating portion includes a video restoring portion for decoding the first coded video data and a re-encoding portion for only intraframely encoding the video-data decoded by the video restoring portion.

4. A video storage and communication device according to claim 2, wherein the video-generating portion includes a video restoring portion for decoding the first coded video data and a re-encoding portion for interframely encoding the video-data decoded by the video restoring portion.

5. A video storage and communication device according to claim 2, wherein the video-generating portion includes a video restoring portion for decoding the first coded video data and a re-encoding portion for still picture encoding the video-data decoded by the video restoring portion.

6. A video storage and communication device used for a video information communication system to distribute video data to a terminal set connected with a communication channel, the communication device comprising:

a receiving portion for receiving a coded video data over the communication channel;

a video generating portion for generating a coded video data to be stored by re-encoding the received coded video data replacing frames of the received coded video data with a corresponding re-encoded frame at an arbitrary interval;

a video storage portion for storing the coded video data generated by the video generating portion;

a video-reproduction control portion for reading the coded video data from the video storage portion; and a transmitting portion for transmitting the coded video data read out by the video-reproduction control portion over the communication channel.

7. A video storage and communication device according to claim 6, wherein the video generating portion includes a restoring portion for decoding the coded video data and re-encoding portion for only intraframely encoding the video-data decoded by the restoring portion.

8. A video storage and communication device according to claim 6, wherein the video generating portion includes a restoring portion for decoding the coded video data and a re-encoding portion for still picture encoding the video-data decoded by the restoring portion.

* * * * *